United States Patent [19]

Arsi

[11] Patent Number: 4,800,371
[45] Date of Patent: Jan. 24, 1989

[54] FREEZE ALARM

[76] Inventor: Joseph N. Arsi, 1209 Wellington Rd., Colonial Heights, Va. 23834

[21] Appl. No.: 900,319

[22] Filed: Aug. 26, 1986

Related U.S. Application Data

[63] Continuation-in-part of Ser. No. 701,032, Feb. 12, 1985, abandoned.

[51] Int. Cl.$^4$ .............................................. G08B 17/06
[52] U.S. Cl. ...................................... 340/593; 137/59; 340/514; 340/586; 340/693; 361/170; 374/147
[58] Field of Search ............... 340/593, 585, 581, 586, 340/693, 514; 137/59; 62/129; 374/148, 163, 176–177, 147; 361/170

[56] References Cited

U.S. PATENT DOCUMENTS

| | | | |
|---|---|---|---|
| 3,745,545 | 7/1973 | Darbo | 340/594 |
| 3,943,499 | 3/1976 | Dunphy | 340/586 X |
| 4,305,289 | 12/1981 | Cornelison | 374/147 X |
| 4,319,228 | 3/1982 | Daniels | 340/693 X |
| 4,356,478 | 10/1982 | Muggli et al. | 340/593 |
| 4,617,559 | 10/1986 | Slansky | 340/576 |
| 4,695,829 | 9/1987 | Everett et al. | 340/586 |

Primary Examiner—Glen R. Swann III
Assistant Examiner—Thomas J. Mullen, Jr.

[57] ABSTRACT

An apparatus for protecting pipes subjected to freezing temperatures. An electric circuit is provided with a switch that senses the ambient air temperature in the vicinity of a pipe to be tested. The switch is set to activate an alarm when the water in the pipe reaches about 4° C. to about 5° C. The electric circuit is contained within a housing that is perforated to permit the sensing of the ambient air temperature. The housing may be provided with velcro straps to secure the housing to a pipe to be tested.

12 Claims, 1 Drawing Sheet

U.S. Patent  Jan. 24, 1989  4,800,371 ced to close within the temperature range of $-1°$ C.

FREEZE ALARM

This application is a continuation-in-part of Ser. No. 701,032, filed Feb. 12, 1985 now abandoned.

This invention relates to a temperature sensing alarm circuit and, more particularly, to such a circuit for sounding an alarm when water in a pipe being tested reaches a temperature of from about 4° C. to about 5° C.

BACKGROUND OF THE INVENTION

Heretofore, it has been known to provide frost warnings for pipes by mechanical means which relied upon expansion of water in an auxiliary narrow diameter pipe to protect a larger diameter pipe. Such a device is shown in U.S. Pat. No. 1,446,783 Calinaud issued Feb. 27, 1923. Not only is such a device expensive to install but also it is relatively unreliable and can result in burst pipes before remedial action can be taken.

SUMMARY OF THE INVENTION

In accordance with the present invention the shortcomings and limitations of the known prior art are effectively overcome. In particular, an electric circuit is provided with a switch that senses the ambient air temperature in the vicinity of a pipe to be tested. The switch is preferably an electroceramic reed switch because of the minimum temperature tolerance and because of its relatively long life. However, bimetallic switches may also be used. The switch is set to activate an alarm when the water in the pipe being tested reaches about 4° C. to about 5° C. Because the pipe acts as a heat insulator the ambient air temperature is already below freezing temperature. It has been determined by experiment that the actual ambient air temperature is in the range of about $-1°$ C. to about $-15°$ C. when the temperature of the water in the pipe is from 4° C. to 5° C. This permits sufficient time for remedial action to be taken. In many instances this consists of opening a valve to permit water to flow through the pipe or pipes in question.

The electric circuit is contained within a housing that is sufficiently perforated to permit the sensing of the ambient air temperature solely by radiation. For the sake of convenience, the housing may be provided with Velcro straps to secure the housing to a pipe to be tested even though heat conduction to the housing and contained circuit is not required for proper operation. The alarm may be either or both at the site of testing and/or at a remote location.

The inherent advantages and improvements of the present invention will become readily apparent by referring to the following detailed description of the invention and by reference to the drawings wherein.

DETAILED DESCRIPTION OF THE INVENTION

Figure 1:
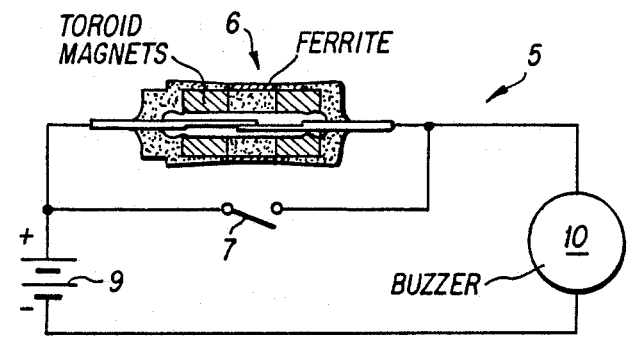
FIG. 1 is a schematic drawing of a D.C. circuit used in the present invention.

Referring now to FIG. 1 of the drawings, there is disclosed a direct current alarm circuit indicated generally at 5 in which an electro-ceramic temperature sensing switch 6 is employed. This is a reed switch which is normally open but is illustrated in its closed position. The temperature sensing reed switch 6 is provided with a ferrite toroidal central portion with toroid magnets disposed on opposite sides thereof. The switch is normally open but is shown in its closed position or alarm sounding position. A single throw momentary switch 7 is placed as a shunt across the temperature sensing switch 6, the momentary pressing of which makes contact to complete the circuit and test the alarm. A D.C. power supply is shown at 9 to provide a voltage of 1.5 volts or higher in order to sound the alarm by actuation of a buzzer 10.

The electro-ceramic temperature switch 6 is prefabricated to close within the temperature range of $-1°$ C. to $-15°$ C. depending upon the known characteristics of the pipe being tested which includes its material, size and wall thickness. At the selected temperature the contacts of the switch close the actuate buzzer 10. This buzzer may be located on site or at a remote location or in both locations, as desired. This permits sufficient time for remedial action to be taken which in most instances consists of opening a valve to permit water to flow through the pipe or pipes in question.

Figure 2:
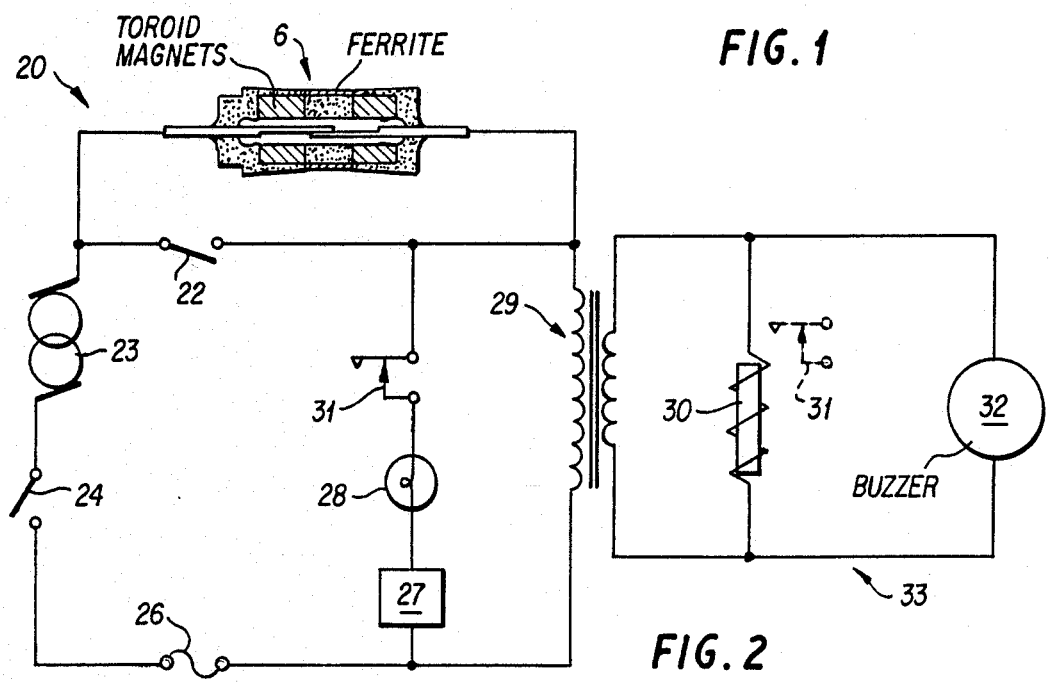
FIG. 2 is a schematic drawing of an A.C. circuit used in the present invention.

Referring now to FIG. 2 of the drawngs, there is illustrated an AC circuit indicated generally at 20. This circuit includes a temperature sensing switch 6 which is an electro-ceramic reed switch as in the previous embodiment. This circuit also includes a momentary test switch 22 and is powered by an AC power supply 23, usually 110 volts. An on/off switch 24 is provided in series with a line fuse 26. The circuit includes a flasher element 27 and a light 28 to yield a warning on the site. The circuit is provided with a step down transformer 29 which provides a voltage of a desired amount in a secondary circuit generally designated 33 to activate relay 30 which controls contact 31 and a buzzer 32. Once again, the buzzer 32 may be located at a remote position where surveillance is more convenient.

A water temperature drop in the pipe to be tested to about 4° C. to about 5° C. triggers temperature sensing switch 6 of the primary circuit 20 causing current to flow through the primary of step down transformer 29 which is coupled to the secondary thereof in secondary circuit 33. This causes relay 30 to be actuated, closing contact 31 and causing the flasher element 27 to make light 28 flash on and off. Concurrently, buzzer 32 is actuated in the secondary circuit 33.

Figure 3:
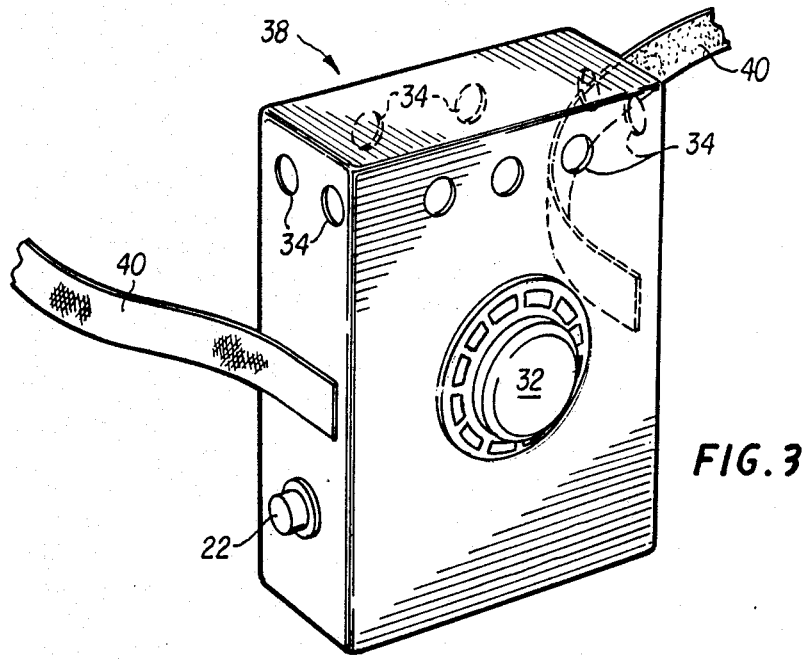
FIG. 3 is a perspective view of a housing for the circuits of the present invention.

Referring now to FIG. 3, a housing is indicated generally at 38 for containing the previously described circuitry. This housing is provided with a sufficient number of apertures or holes 34 to permit the ambient air temperature to be sensed by the temperature sensing switch within the housing 38. As a matter of convenience, the housing may be provided with Velcro strap means 40 in order to attach the housing 38 to a pipe to be tested. Velcro is a trademark of Velcro, Inc., of Manchester, N.H., for separable fasteners, namely, hook and loop type fasteners.

The flashing light illustrated in FIG. 2 is used in areas such as well houses, out buildings, or areas containing water pipes which are in view, but where no person is in close proximity.

In FIG. 3, a test switch is placed in the circuit such as is illustrated at 22 which is actually a momentary contact switch shunting the temperature sensor and turning on the alarm circuit. By using the sensors shown herein, the freeze alarm can be placed in any vertical or horizontal position and still be activated at the desired temperature.

The principles of the present invention may be applied to both higher and lower temperatures from that discussed herein and may be used to control chemical reactions. Though not so efficient as the electroceramic reed temperature sensing switch disclosed herein, bimetallic switch means may be used as the temperature sensing means.

While the invention has been illustrated and described with respect to preferred embodiments thereof, it will be recognized that the invention may be otherwise variously embodied and practiced within the scope of the claims which follow.

I claim:

1. An apparatus to be used in attics, crawl spaces and other areas where no heat is normally present for protecting water containing pipes subjected to freezing temperatures which comprises:
   a. electric circuit means including a power supply,
   b. switch means in said circuit for sensing the ambient air temperature in the vicinity of a water containing pipe to be tested,
      1. said switch means being preset to be activated only when the water in the pipe being tested reaches a temperature of about 4° C. to about 5° C.,
   c. and alarm means responsive to said switch means to warn of the imminent freezing of said water in said tested pipe.

2. An apparatus for protecting pipes as defined in claim 1 including test circuit means in said electric circuit which provides a shunt for said switch means for testing the operability of said alarm means.

3. An apparatus for protecting pipes as defined in claim 1 wherein said switch means is a reed switch.

4. An apparatus for protecting pipes as defined in claim 1 wherein said electric circuit means is encased within a housing member with said housing member being perforated to permit the sensing of the ambient air temperature.

5. An apparatus for protecting pipes as defined in claim 1 wherein said housing member is provided with Velcro strap members to permit the strapping of said housing to a pipe to be tested.

6. An apparatus for protecting pipes as defined in claim 1 wherein said power supply is an AC power supply and said circuit means includes a step down transformer and relay means activated by said switch means.

7. An apparatus to be used in attics, crawl spaces and other areas where no heat is normally present for protecting water containing pipes subjected to freezing temperatures which comprises:
   a. electric circuit means including a power supply,
   b. switch means in said circuit for sensing the ambient air temperature in the vicinity of a water containing pipe to be tested,
      1. said switch means being preset to be activated only when said ambient air temperature is in the temperature range of from about $-1°$ C. to about $-15°$ C.,
   c. and alarm means response to said switch means to warn of the imminent freezing of said water in said tested pipe.

8. An apparatus for protecting pipes as defined in claim 7 including test circuit means in said electric circuit which provides a shunt for said switch means for testing the operability of said alarm means.

9. An apparatus for protecting pipes as defined in claim 7 wherein said switch means is a reed switch.

10. An apparatus for protecting pipes as defined in claim 7 wherein said electric circuit means is encased within a housing member with said housing member being perforated to permit the sensing of the ambient air temperature.

11. An apparatus for protecting pipes as defined in claim 7 wherein said housing member is provided with Velcro strap members to permit the strapping of said housing to a pipe to be tested.

12. An apparatus for protecting pipes as defined in claim 7 wherein said power supply is an AC power supply and said circuit means includes a step down transformer and relay means activated by said switch means.

* * * * *